United States Patent [19]

Rémus et al.

[11] Patent Number: 4,460,859
[45] Date of Patent: Jul. 17, 1984

[54] STEPPING MOTOR ASSEMBLY

[75] Inventors: Hans-Jürgen Rémus, St-Aubin, Switzerland; Luciano Antognini, Champaign, Ill.

[73] Assignee: Asulab S.A., Bienne, Switzerland

[21] Appl. No.: 461,292

[22] Filed: Jan. 27, 1983

[30] Foreign Application Priority Data

Jan. 28, 1982 [CH] Switzerland .............................. 517/82
Jul. 1, 1982 [CH] Switzerland .......................... 4011/82

[51] Int. Cl.³ ............................................ H02K 29/02
[52] U.S. Cl. .................................... 318/696; 318/685; 368/157
[58] Field of Search ................. 318/696, 685; 368/157, 368/188, 160

[56] References Cited

U.S. PATENT DOCUMENTS

| | | | |
|---|---|---|---|
| 4,066,947 | 1/1978 | Nakajima et al. | 318/696 |
| 4,112,671 | 9/1978 | Kato et al. | 368/188 |
| 4,157,647 | 6/1979 | Takahashi | 318/696 |
| 4,241,434 | 12/1980 | Shida et al. | 318/696 |
| 4,242,623 | 12/1980 | Oudet et al. | 318/696 |
| 4,375,049 | 2/1983 | Grand Chavin | 318/696 |

*Primary Examiner*—G. Z. Rubinson
*Assistant Examiner*—Saul M. Bergmann
*Attorney, Agent, or Firm*—Pollock, Vande Sande & Priddy

[57] ABSTRACT

The motor assembly comprises a bidirectional stepping motor having a coil, a stator provided with a central opening in which is mounted for rotation about an axis a rotor including a permanent magnet which is magnetized along an axis of magnetization, and positioning means for defining two rest positions of the rotor in which the axis of magnetization of the magnet is directed along an axis of static equilibrium. The stator is formed of two pole pieces which partly surround the rotor and are interconnected by two intermediate parts and by four isthmuses in such a manner that the intermediate parts are intersected by the axis of static equilibrium and that two isthmuses which are opposite each other in relation to the axis of rotation of the rotor are located in one direction making with the axis of static equilibrium an angle of between 30° and 60°. Two of these isthmuses which are located in the same direction have a width such that they are very rapidly saturated with magnetic flux when the coil produces in the stator, in response to a driving pulse, a magnetic field which enables the rotor to be made to turn in one direction, while the other two isthmuses have a width two to four times greater so that, when the coil generates a magnetic field which causes the rotor to turn in the other direction, the wide isthmuses, or, in this case again the narrow isthmuses become saturated, but less rapidly, so as to obtain a difference in the form of the current in the coil which enables a control device associated with the motor to determine the direction in which the rotor prepares to turn in response to a driving pulse and to avoid any unintentional reversal of the direction of rotation of the motor.

24 Claims, 19 Drawing Figures

STEPPING MOTOR ASSEMBLY

BACKGROUND OF THE INVENTION

The present invention relates to stepping motors, intended particularly to be used for driving display members, (for example the hands), of an electronic timepiece, through a gear train. The invention also concerns control devices associated with these motors.

The majority of electronic watches with conventional display means are provided with a bipolar single phase stepping motor comprising firstly a rotor including a permanent magnet, which is generally cylindrical and diametrically magnetised, secondly a stator formed of two pole pieces which surround the rotor and are separated by two regions of high reluctance and thirdly a control coil surrounding a core which is coupled magnetically with the stator. The regions of high reluctance are constituted by air gaps in the case of a two-part stator or by isthmuses in the case of a one-piece stator. The stator is shaped in such a manner as to provide for the rotor an axis of static equilibrium which is inclined at a certain angle with respect to the axis joining the gaps or the isthmuses. The motor thus has two predetermined rest positions which are angularly spaced apart by 180°.

Associated with this motor is a control circuit which, in response to low frequency pulses which it receives from a time base comprising a quartz oscillator and a frequency divider, produces and applies to the control coil driving pulses of alternating polarity which cause the rotor to rotate in 180° steps in the direction corresponding to the normal direction of rotation of the hands or the clockwise direction. The duration of these driving pulses, which is generally 7.8 ms., is chosen so as to ensure the regular operation of the motor.

Such a system has one serious disadvantage. The pursuit of optimum efficiency for the motor necessitates giving the angle which the axis of static equilibrium of the rotor makes with the axis joining the gaps or isthmuses a value of about 45° which produces a corresponding phase displacement between the torques to which the rotor is subjected, more precisely between the static positioning torque due solely to the flux of the magnet, which defines the positions of static equilibrium of the rotor when the motor is not supplied with current and the mutual magnet-coil torque due to the interaction between the flux of the magnet and the flux generated by the coil when a current flows through it. Such a phase displacement prevents the possibility of reversing the direction of rotation of the motor in a simple manner by reversing the order of the positive and negative driving pulses which are applied to it when the watch is functioning normally.

This non-reversibility makes it necessary to provide, in these conventional watches, for the modification of the data to be displayed, such as the correction of the time or the changing of the time zone, either mechanical devices which make possible a correction of the time indication in either direction, (advance and retard), but which are cumbersome, relatively complex and most often of high precision and therefore expensive, or electronic devices which only provide a correction in a single direction. In this second case the motor is supplied, during a correction, with pulses having a frequency which is fixed or dependent on the speed of actuation of a manual control member and which is distinctly higher than that used when the watch is functioning in the normal manner. However, in order that the motor should be able to respond to each of the correction pulses, the high frequency has to remain sufficiently low, generally not exceeding 32 or 64 Hz, even although the correction time may be long.

Numerous proposals have been made for solving this problem with different orientations.

A first possibility consists in perfecting motors specially designed so as to rotate in both directions. There are for example in existance two-phase motors, the two coils of which are supplied either simultaneously or successively, which have a very high efficiency, furnish a substantial useful torque and the functional ranges of which in frequency and/or in voltage are very wide, but which have two serious disadvantages for a horological application: they are more cumbersome and have a much higher manufacturing cost than conventional motors.

Another possibility consists in continuing to use the same motor without modifying it and to associate with it a control device capable of producing and applying to it driving pulses which are adequate for causing it to turn in the anti-clockwise direction, either directly from its position of stable equilibrium by means for example of two successive pulses of different polarity, or by subjecting the rotor to a swinging movement. In this latter case, the motor receives a first pulse which causes the rotor to turn in the normal direction up to a certain position. When the rotor has reached this position, the control device transmits to the motor one or two other pulses of a suitable duration and polarity, the energy of which becomes added to that acquired by the rotor during its movement in the clockwise direction and enables the latter to rotate in the opposite direction. The duration of the first pulse may be insufficient to cause the motor to complete one step, but is provided for example for bringing the rotor into the position in which it can receive a maximum reverse torque during the application of the next pulse or else be equal to that of the pulses produced by the control circuit under conditions of normal functioning and which permit the rotor to attain and pass beyond its other rest position, in which case it is then possible to cause the latter to rotate through one complete revolution in the anti-clockwise direction with the aid of second and third pulses, which are respectively of the same sign as and of the opposite sign to that of the first pulse, the second pulse commencing at the moment when the rotor passes by the said other rest position again.

Such systems make it possible to continue to benefit from the advantages of traditional motors which are not very bulky, are simple and of low cost while having a satisfactory efficiency and consumption under normal running conditions. On the other hand, the performance when running in reverse is mediocre and the control circuit which must supply successive pulses of different polarities and often of different durations is necessarily complex. In addition, the range and reliability of operation are limited by the fact that, at the instants when the different pulses are applied, the position of the rotor is badly defined because of the variations of the operational conditions, especially the changes of load and the variations due to manufacture.

Another solution proposed in U.S. Pat. No. 4,066,947, which is concerned with a motor having a two-piece stator, consists in reducing the angle between the axis joining the air gaps and the axis of static equilibrium to a value between 30° and 0°, the upper value, which corresponds to the highest output torque when running forward, being reserved for motors that are liable to be subjected to a heavy load, for example for driving a calender mechanism, and the lower value being on the contrary selected for low loads and for obtaining the same performances when running forward and when running backward. Such a motor may be controlled in both directions by simple alternating pulses of the same duration; it is sufficient to reverse the order of the polarities. It may therefore be associated with a simple control circuit. In addition, the modifications compared with a unidirectional motor are minimal and do not involve increasing the cost of manufacture. This solution, however, has several disadvantages: first of all the possibility of rotating in both directions is obtained at the expense of a distinct reduction of efficiency when running forward compared to that of a unidirectional motor. Moreover, such a motor does not enable comparable performances in the forward and reverse directions to be reconciled with reliable operation since, in the vicinity of 0°, the rest positions of the rotor are very badly defined despite the existence of slots in the pole pieces for the positioning thereof and even supposing that there is no eccentricity between the two parts of the stator, which is difficult to achieve. Finally, there is the risk of a reversal of the direction of rotation when the rotor accidentially misses or runs past a step.

These two last-mentioned disadvantages are no longer present in another known motor with a symmetrical stator in which the $\pi$-periodic positioning torque is replaced by an indexing torque produced by a permanent magnet located in the vicinity of one of the air gaps. The rotor, which then has only a single rest position, rotates each time through 360° under the action of two successive pulses of opposite polarities, the order of succession of the polarities of these two pulses determining the direction of rotation, from which results the disadvantage of a relatively complicated control circuit which is additional to an increase in the manufacturing cost due to the presence of an extra magnet.

BRIEF SUMMARY OF THE INVENTION

One object of the present invention is to provide a reversible stepping motor which enables the disadvantages of these various different known solutions to be eliminated at least to a large extent.

This aim is achieved by a bidirectional stepping motor comprising a rotor which includes a permanent magnet with at least one pair of opposed magnetic poles which define an axis of magnetization; a stator provided with a central opening within which the rotor is mounted for rotation about an axis, this stator comprising opposed first and second pole pieces which partly surround the rotor and are connected to each other on both sides of this rotor by means of a first intermediate part and first and second connecting parts between this first intermediate and the second and first pole pieces respectively and of a second intermediate part and third and fourth connecting parts between this second intermediate part and the first and second pole pieces respectively, the connecting parts being arranged to form areas having a low magnetic permeance with regard to the pole pieces; a coil magnetically coupled to the stator for producing a magnetic field therein in response to a driving pulse; and positioning means for defining two rest positions of the rotor in which the axis of magnetization of the magnet is directed along an axis of static equilibrium which intersects the intermediate parts of the stator.

Advantageously, the first and third connecting parts, respectively the second and fourth connecting parts, are located substantially symmetrically in relation to the axis of rotation of the rotor in a direction inclined to the axis of static equilibrium at an angle of between 30° and 60°, preferably substantially equal to 40°, in a direction corresponding to a first, respectively a second, direction of rotation of the rotor.

In addition, it is preferably that the connecting parts should be arranged so that the first and the third of them are saturated with magnetic flux, that is to say that their permeability attains practically that of empty space, when the coil generates in the stator, in response to a driving pulse, a magnetic field which enables the rotor to be made to turn in the first direction of rotation.

It is equally desirable that, when the coil produces in the stator a magnetic field which enables the rotor to be made to turn in its second direction of rotation, either the second and fourth connecting parts or, here again, the first and third connecting parts will be saturated with magnetic flux.

In the first case, the connecting parts may be arranged so that the time taken by the second and fourth connecting parts to attain saturation is substantially the same as that which is necessary for the two other connecting parts to become saturated when the rotor is caused to turn in the first direction, in which case the motor will be symmetrical and will theoretically have the same performances in both directions; however, it is advantageous that the time of saturation of the second and fourth connecting parts should be greater than that of the others.

A simple way of putting the invention into operation is to make the stator in one piece of approximately uniform thickness and of a material of high magnetic permeability and to provide isthmuses of substantially the same width at least as the first and third connecting parts.

The second and fourth connecting parts may then also be constituted by isthmuses which, in the case of a symmetrical motor, have a width equal to that of the two others and, in the contrary case, a width of twice to four times, and preferably about three times, greater.

It is equally possible to make, on the one hand, the first intermediate part and the second connecting part and, on the other hand, the second intermediate part and the fourth connecting part, in such a manner that they form two portions of the stator the width of which may be approximately uniform or increasing from the isthmuses which constitute the first and third connecting parts, remaining advantageously between twice and four times that of the isthmuses.

The motor according to the invention is capable of achieving good performances both when running forward and also when running backward while being driven in both directions by the same simple pulses of alternating polarity as a conventional unidirectional motor, the direction of rotation of the rotor being normally determined by the order of succession of the polarities of the said pulses.

It may moreover be designed in a simple less cumbersome and less expensive form. Nevertheless, it continues to have one of the disadvantages of certain known bidirectional motors: that of a possibility of reversal of the direction of rotation when the rotor does not complete its step in the normal manner or, on the contrary, passes accidentically from one rest position to the other.

Another object of the invention is to solve this problem.

This object is easily attained by choosing to produce the motor in an asymmetrical form and associating with it a control device which includes in a conventional manner signal-generating means for producing signals at the driving frequency of the motor, a pulse-forming circuit coupled to the signal-generating means for providing normal control pulses and a control circuit for supplying normally to the coil of the motor, in response to the normal control pulses and to a signal of control of the direction of rotation, normal bipolar driving pulses in an order of succession corresponding to the direction in which the rotor of the motor should turn, but which also includes means for determining the direction of rotation of the rotor which compare, at a predetermined instant after the beginning of each normal driving pulse, the value of the current in the coil with a threshold value and furnish a signal representative of the direction in which the driving pulse tends to cause the rotor to turn, comparing means for comparing the signal furnished by the means for determining the direction of rotation with the signal of control of the direction of rotation and for delivering a correction control signal when the direction of rotation is incorrect and means responsive to the correction control signal for interrupting the normal driving pulse and controlling the application of a correction driving pulse in order to make the rotor turn in the direction imposed by the signal of control of the direction of rotation.

Advantageously, the control circuit is designed so that the application of a correction driving pulse produces the reversal of the order of succession of the polarities for the following normal driving pulses.

In addition, the comparison between the current in the coil and the value of the threshold preferably takes place before the rotor has begun to turn under the action of the normal driving pulse.

The motor assembly thus obtained is very reliable and furthermore economic because, like the motor, the control device may be made in a very simple form.

BRIEF DESCRIPTION ON THE DRAWINGS

The invention will be better understood from the description which follows, given with reference to the annexed drawings, in which:

FIG. 1 is a diagrammatic plan view of a conventional bipolar, single-phase stepping motor with a one-piece stator;

FIG. 2 is a diagram showing the variations, as a function of the angular position $\theta$ of the rotor, of the positioning torque of the rotor and of the mutual magnet-coil torque obtained with the motor shown in FIG. 1 when it is supplied with simple driving pulses of alternating polarity which enable it to be caused to rotate normally, as well as the torques which would be obtained if the motor received pulses which are of the same type but have a polarity which is reversed compared with the previous ones;

DETAILED DESCRIPTION OF PREFERRED EMBODIMENTS

Figure 1:
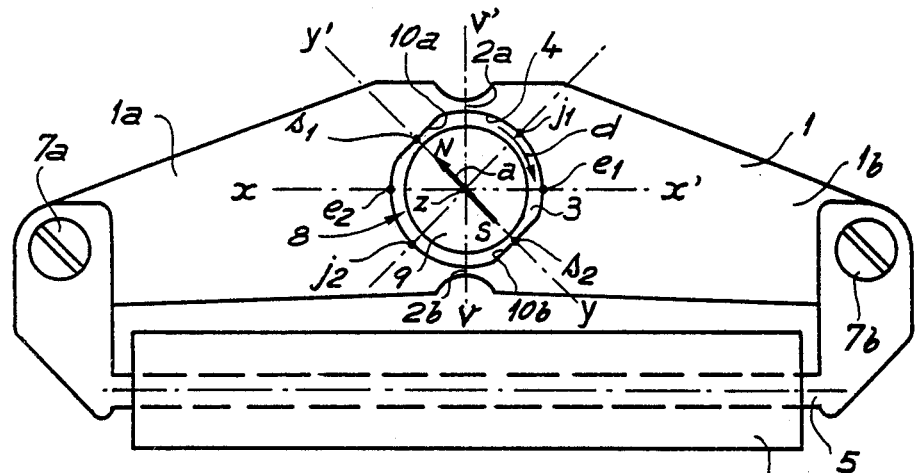

FIG. 1 shows diagrammatically a possible constructional form of a conventional bipolar single-phase motor having a one-piece stator.

The motor includes a stator 1 of substantially uniform thickness, made of a soft magnetic material and comprising two relatively massive main parts or pole pieces $1a$, $1b$ interconnected by narrow parts or isthmuses $2a$ and $2b$ so as to form a central opening 3 which has essentially the form of a cylinder of revolution. The stator 1 is coupled magnetically to a part 5, also of soft magnetic material, which constitutes the core of a coil 6. The stator 1 and the core 5 are connected together by screws $7a$ and $7b$.

A rotor comprising a cylindrical permanent magnet 9 with diametral magnetisation is housed in the central opening 3 in such a manner as to be able to rotate about an axis z coincident with the axis of this opening.

Finally the interior wall surface 4 of the stator which delimits the central opening 3 has two diametrally opposed flats $10a$, $10b$ of equal size which make it possible to impose on the rotor 8 two rest positions in which the axis of magnetisation a of the magnet is directed along an axis of static equilibrium y—y' substantially perpendicular to these flats and forming with the straight line v—v' which connects the isthmuses $2a$, $2b$ an angle of about 45°.

In the absence of current in the coil 6, the rotor 8 occupies one of its rest positions, for example that shown in the drawing and indicated by the point $s_1$, in which the north pole of the magnet is positioned opposite the flat $10a$ located on the side of the pole piece $1a$. A part of the magnetic flux created by the magnet flows through the core 5 of the coil, while the other part, which is divided into two remains in the vicinity of the opening 3 and passes through the isthmuses $2a$, $2b$ which are not then normally saturated in the sense of the definition of non-saturation and saturation which will be given later.

When a driving pulse, for example positive, is applied to the coil so as to cause the rotor 8 to rotate in the normal direction of rotation indicated by the arrow d, the current which passes through this coil produces a magnetic flux which, at the very beginning of the pulse, passes through the magnetic circuit constituted by the stator 1 and the core 5. The major part of this flux goes from the first pole piece $1_a$ to the second $1_b$ passing through the isthmuses $2_a$, $2_b$ in which it is added to the flux of the magnet 9, the remainder flowing out into the air, near the constrictions.

The reluctance $R_{bb}$ of the magnetic circuit as seen from the coil is then very weak. Because of this, the time constant $\tau$ of the series circuit comprising the resistance R and the inductance L of the coil given by the formula $\tau = L/R = N^2/R_{bb}$, where N represents the number of turns of the coil, is then very high and the current increases slowly.

As the current in the coil, and consequently the flux created thereby, increases, the isthmuses approach more nearly to saturation, their permeability diminishing very rapidly. A part of the flux generated by the coil then begins to penetrate into the central opening 3 and to traverse the magnet. When, at the end of a period of time, which is in fact very short, after the beginning of the driving pulse, the current attains a certain value, the isthmuses are completly saturated and then behave like air gaps, their permeability attaining practically the permeability $\mu_o$ of air. The time constant $\tau$ then having become very weak, the current begins to increase very rapidly. When the flux across the magnet becomes sufficient, the rotor is caused to rotate and turns through 180° so that it comes to occupy its other rest position indicated by the point $s_2$.

Figure 2:
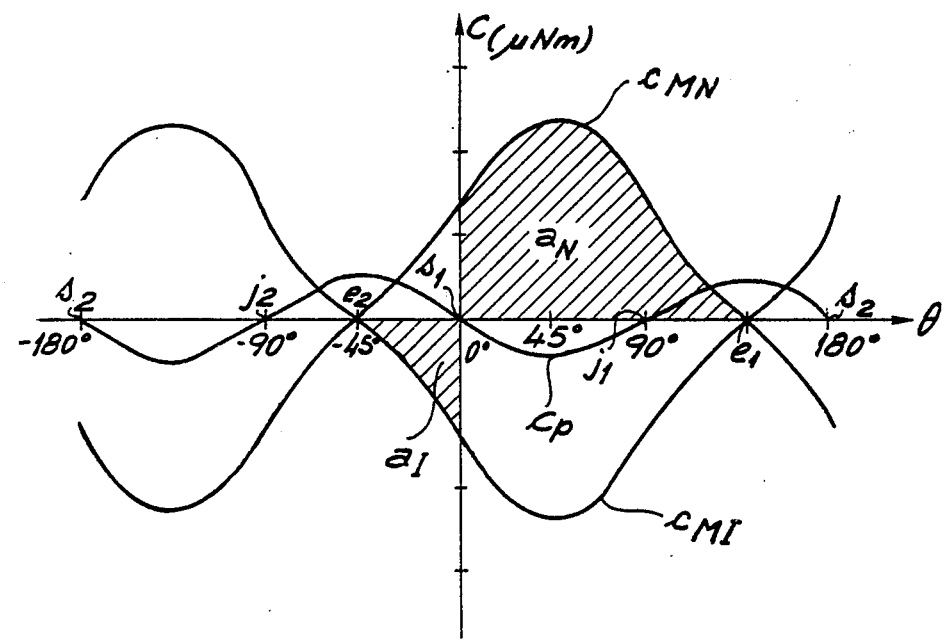

FIG. 2 shows the values of the torques which act on the rotor in terms of its angle of rotation $\theta$ marked with reference to the rest position $s_1$ in which it is shown in FIG. 1.

The curve $c_p$ represents the positioning torque due to the magnet alone, the period of which is 180° and which defines the rest positions $s_1(0°)$ and $s_2(180°)$ of the rotor for which it is reduced to zero. Due to the cylindrical form of the magnet, the torque $c_p$ is practically sinusoidal. The point $j_1$ and $j_2$ ($\pm 90°$), for which this torque likewise assumes the value zero, corresponds to unstable positions of static equilibrium (see also FIG. 1).

The other torque to which the rotor is subjected is the mutual magnet-coil torque $c_{MN}$ due to the interaction of the flux of the magnet with that generated by the coil. This torque $c_{MN}$ also has a form which is substantially sinusoidal, its period being 360°. It is moreover out of phase with respect to the positioning torque $c_p$ by an angle of about 45°, that is to say that it is maximal when the magnetisation axis a of the magnet is disposed in the direction v—v' interconnecting the isthmuses $2_a$, $2_b$.

It is to be noted that, with a view to simplification, there has been left out of account the resistant torque, i.e. the sum of the frictional torques and the load torques due to the mechanical parts which the motor must drive and which in particular have the effect of displacing the positions of static equilibrium of the rotor with respect to those indicated in FIGS. 1 and 2.

The action of the mutual magnet-coil torque depends on the duration of the driving pulse and, for a given duration, on the time which the rotor takes to complete one step, that is to say on its load.

If, for example, the pulse is maintained until the mutual torque falls to zero, that is to say until the rotor has reached the position at which the total magnetic flux across the magnet, as well as in the core of the coil, is maximal, the rotor is first of all brought from its rest position $s_1$ to the position of unstable equilibrium $j_1$ owing to the mutual torque $c_{MN}$, which is then very much higher than the positioning torque $c_p$ which opposes this movement, under the combined action of the mutual torque and of the positioning torque which has become positive. The rotor then continues its movement owing to the acquired kinetic energy and to the positioning torque. If, on the contrary, the driving pulse is maintained after the rotor has reached the position $e_1$, for example until the rotor has turned through 180°, the mutual torque becomes a braking torque beyond this point $e_1$.

Moreover, the diagram shows that in fact the rotor receives the essential part of the energy which can be communicated to it and which is represented by the hatched area $a_N$ located under the curve $c_{MN}$ between the points $s_1$ and $j_1$. It is then possible, in particular with a view to reducing the consumption of the motor to interrupt the driving pulse applied to the coil before the rotor has attained the position $e_1$ and even the point $j_1$. It is sufficient in this case to provide a pulse duration sufficient to enable the rotor to store a kinetic energy which first of all enables the positioning torque $c_p$ to be overcome, to which must be added in practice, the resistant torque, this latter as far as the point $j_1$, and which then helps the positioning torque to overcome the resistant torque so as to bring the rotor to its rest position $s_2$.

When the coil receives later a driving pulse of a polarity opposite to that of the previous one, that is to say negative, the motor operates in the same manner, the direction of the magnetic flux then being reversed. The rotor then turns again through 180° in the same direction d in order to assume the rest position which it occupied before the appearance of the first pulse. The intermediate characteristic positions of the rotor are then the points $j_2$ and $e_2$ which are opposite $j_1$ and $e_1$ respectively.

FIG. 2 also shows the mutual magnet-coil torque $c_{MI}$ which would be obtained if, while the rotor occupies its rest position $s_1$, the motor received a pulse of the same amplitude, but negative, that is to say of the opposite polarity to that which enables the rotor to be made to rotate in the normal direction d. The curve $c_{MI}$ is symmetrical to the curve $c_{MN}$ with respect to the axis of the abscissa $\theta$. The positioning torque remains unchanged.

It is noted that the rotor can be subjected to a mutual motor torque only between the point $s_1$ and the point $e_2$ opposite the point $e_1$ on the axis x—x' (FIG. 1), that is to say over an angle of about 45°. Moreover, the value of this torque $c_{MI}$ does nothing except decrease between 0° where it is already low and −45°. It follows that the energy which the rotor can receive and which is represented on the graph by the hatched surface $a_I$ is highly insufficient for enabling it to complete a step in the direction opposite to the normal direction. At best, the rotor will move weakly away from its rest position $s_1$ and then return to it. Often, the mutual torque $c_{MI}$ will be insufficient to overcome the positioning torque as well as the resistant torque and the rotor will remain stationary. It is therefore not possible to make the rotor rotate in the direction opposite to its normal direction of rotation merely by reversing the polarity of the driving pulses.

One solution for arriving at this goal would consist in doing in this case the same thing as that which is recommended by U.S. Pat. No. 4,066,947 in the case of a stator in two parts, that is to say to reduce the angle between the axis of static equilibrium y—y' and the straight line v—v' on which the isthmuses are located, which would revert to relocating the mutual torques $c_{MN}$ and $c_{MI}$ parallel to the axis of the abscissa in the sense of decreasing angles. It would be sufficient for this to modify the position of the flats $10_a$ and $10_b$ (FIG. 1). Nevertheless, it can be seen, when considering FIG. 2, that such a solution would not be very satisfactory. The reduction of the angle to for example 30° in order to preserve reliability of operation and acceptable performances in the normal direction of rotation would result in only a slight increase in the area $a_1$. On the contrary, the choice of a zero angle, that is to say the production of a perfectly symmetrical motor would be equivalent to reducing considerably the driving energy represented by the area $a_N$ for the normal or clockwise direction of rotation and to obtaining for each direction of rotation a mutual torque which has a maximum value at the outset and which continually decreases, which is not favourable to good operation of the motor. The performances would then be unsatisfactory in both directions.

In fact, what is desirable is to be able to obtain for reverse running as for forward running a mutual torque which maintains a high value as long as the rotor has not turned through an angle of at least forty degrees and which preferably has a maximum value when the rotor has just left its rest position, that is to say to approach as nearly as possible what is achieved in the case of a conventional motor when it is driven in its normal direction of rotation.

Figure 3:
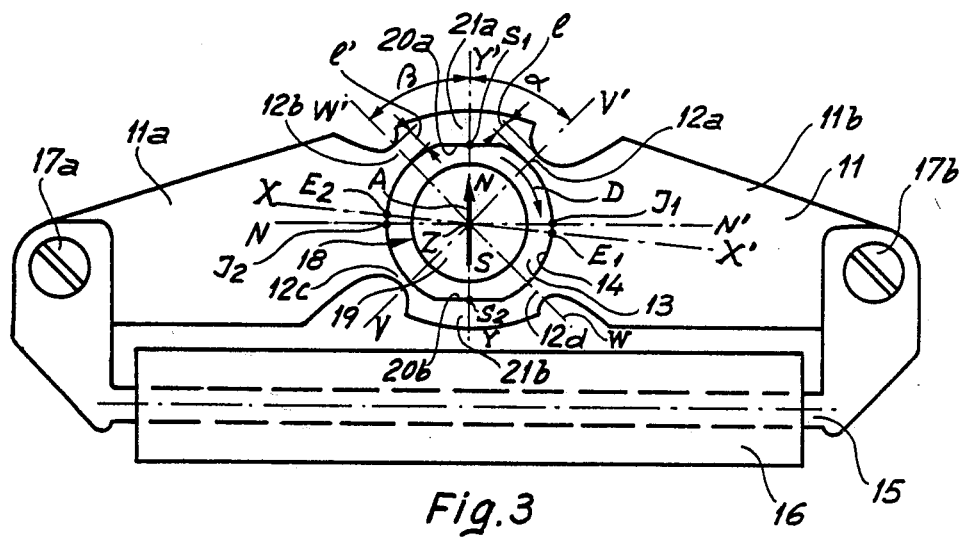
FIG. 3 is a diagrammatic plan view of a first embodiment of the stepping motor according to the invention.

These conditions which make it possible to ensure good performances of the motor in both directions of rotation and to limit the loss of power when running forward for the benefit of that when running in reverse, which is inevitable when the motor is driven by the same simple pulses in both directions, are fulfilled by the motor according to the invention, a first possible embodiment of which is shown in FIG. 3.

This motor, like the conventional motor of FIG. 1, includes a one-piece stator 11 of substantially uniform thickness fixed by screws $17_a$ and $17_b$ to the core 15 of a coil 16 and a rotor 18 provided with a cylindrical permanent magnet 19 which is diametrally magnetised and mounted for rotation about an axis Z in a central opening 13 provided in the stator 11. This opening is in the present case delimited once again by an interior wall surface 14 in the form of a cylinder of revolution having an axis coincident with the axis Z of rotation of the rotor 18, except in two diametrically opposite regions where it is constituted by flats $20_a$ and $20_b$ in order to provide the rotor 18 with two rest positions in which the axis of magnetisation A is disposed along the axis of static equilbrium Y—Y'.

The stator 11, like the core 15, is made of a soft magnetic material selected, for example, from among the alloys known under the names "ULTRAPERM 10", "VACOPERM 100", "MUMETALL" or "PERMAX M" and the relative permeability of which can reach, and even in certain circumstances considerably exceed, the value 100,000.

Unlike the motor of FIG. 1, the first and second massive pole pieces $11_a$, $11_b$, which form part of the stator 11 and which are located in this case one on each side of the axis Y—Y', only partly surround the rotor 18 and are interconnected by first and second intermediate parts $21_a$ and $21_b$ as well as by four connecting parts constituted in this embodiment by isthmuses $12_a$, $12_b$, $12_c$ and $12_d$. More precisely, a first isthmus $12_a$ and a second isthmus $12_b$ form the junctions between the first intermediate part $21_a$ and the first and second massive parts $11_a$ and $11_b$ respectively, while a third isthmus $12_c$ and a fourth isthmus $12_d$ connect the second intermediate part $21_b$ with the first and second pole pieces respectively. The first and third isthmuses $12_a$, $12_c$ are moreover located more or less symmetrically with respect to the axis Z of rotation of the rotor 18 in a direction V—V' which makes with the axis of static equilibrium Y—Y' an angle of between 30° and 60°, preferably substantially equal to 40°. The same applies to the second and fourth connecting parts $12_b$ and $12_d$ which are located in a direction W—W'.

Finally, the two isthmuses $12_a$, $12_c$ located in the direction V—V' which is offset angularly with respect to the axis Y—Y' in the clockwise direction corresponding to that in which the rotor will be caused to rotate most often and in which the motor will preferably produce the best performances and which is indicated by the arrow D, have a common width l sufficiently small to enable them to be saturated practically immediately and totally with magnetic flux when the coil receives a driving pulse which enables the rotor to be rotated in said clockwise direction. The two other isthmuses $12_b$, $12_d$ have a width l' greater than l, the value of the ratio l'/l being between 2 and 4 and preferably equal to three.

The justification for this asymmetry will appear clearly from the following.

It is to be noted that, from the point of view of manufacture, the motor which has just been described is very similar to the conventional motor of FIG. 1. The differences that exist have pratically no effect as regards the time and cost of manufacture of the stator and the manufacturing costs are approximately the same in both cases.

The operation of the motor of FIG. 3 will now be explained with the aid of FIGS. 4 to 8, mainly as regards the static phase which occurs between the instant when a driving pulse is applied to the coil and that when the rotor begins to rotate.

It is well known that, in a ferromagnetic medium, the magnetic induction B is related to the magnetic field H by the very general expression $$B(H) = \mu_0 \mu_r(H) H + B_R$$

where $\mu_o$ designates the permeability of vacuum, $\mu_r$ the relative permeability of the medium which is a function of the magnetic field and $B_R$ the residual induction.

Figure 4:
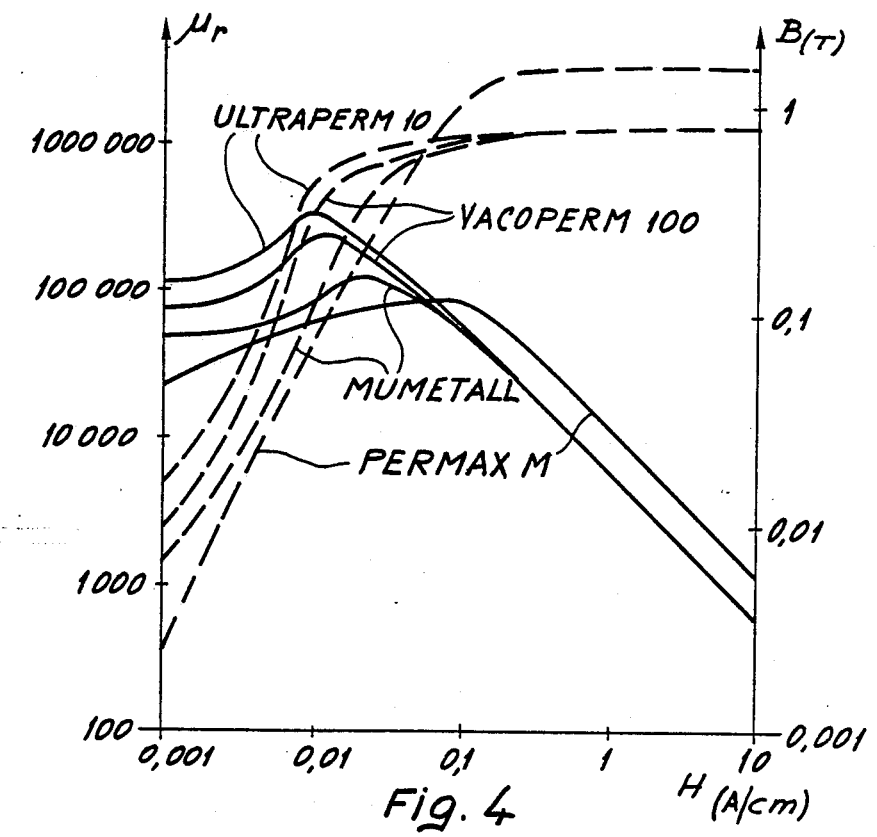
FIGS. 4 and 5 are diagrams showing curves of relative permeability and saturation and which enable the operation of the motor shown in FIG. 3 to be explained.
Figure 5:
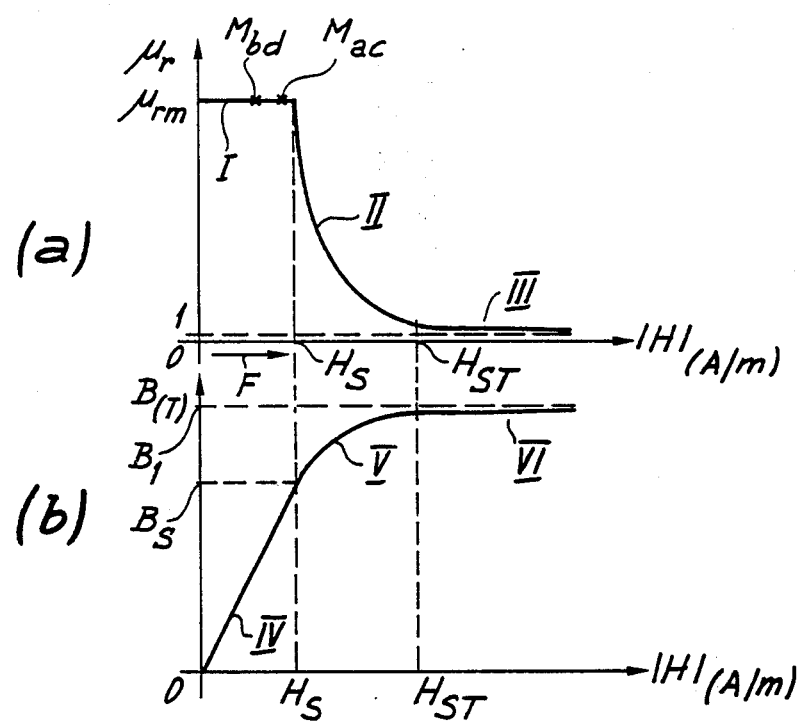

The form of the curves $\mu_r(H)$ and $B(H)$, as well as the values which the relative permeability and the magnetic induction can assume, are often distinctly different from one material to another. This is illustrated by FIG. 4 which shows, for a certain range of values of the magnetic field H and for each of the four abovementioned alloys, the characteristic $\mu_r(H)$ and the saturation curve $B(H)$ represented respectively by a continuous line and a discontinuous line.

Because of these differences it is preferable, in order to explain clearly the operation of the motor, not to refer to the actual curves and to select a representation which approximates to the variation in the relative permeability and in the magnetic induction and which is valid with a good approximation for all the materials which can actually be used for the manufacture of the stators of stepping motors.

Among the models that have been proposed up to the present time for simulating the curves $\mu_r(H)$ and $B(H)$, the one which has been retained is shown in FIG. $5_a$ so far as the relative permeability is concerned and in FIG. $5_b$ so far as the magnetic induction is concerned. It is to be noted that, unlike FIG. 4, the form of the curves of FIGS. $5_a$ and $5_b$ corresponds to a graph with decimal scales and not logarithmic ones, on the different axes, but that these scales have not in fact been respected. It must likewise be remarked that these curves are valid for a non-remanent material or for one for which the hysteresis phenomenen can be disregarded, which means that the term $B_R$ of the above equation is null or may be considered as such. Moreover, it is noted that the relative permeability and the induction have been shown in terms of the amplitude $|H|$ of the magnetic field. In order to obtain complete curves, that is to say curves which also enable the direction of the magnetic field to be taken account of, it will be sufficient to produce a symmetry with respect to the axis of ordinates in regard to $\mu_r$ and with respect to the origin of the coordinates for the induction B.

The curve $\mu_r(|H|)$ of FIG. $5a$ is composed of three portions: a first portion I in which the relative permeability remains constant and equal to a maximum value $\mu_{rm}$ when the amplitude of the magnetic field passes from a zero value to a value $H_S$, a second portion II constituted by a hyperbolic part in which the permeability decreases very rapidly down to a very low value close to unity, while the field increases from the value $H_S$ to a value $H_{ST}$ and a third portion III formed by a straight line virtually parallel to the axis of the abscissa, $\mu_r$ then tending towards the value 1.

The saturation curve $B(|H|)$ is likewise divided into three parts which naturally correspond to the three portions of the characteristic $\mu_r(|H|)$. The relative permeability being considered as constant between the values zero and $H_S$ of the field, the magnetic induction is in this region proportional to $|H|$. The first part IV of the curve is therefore constituted by a straight line joining the origin to the point of the coordinates $H_S$ and $B_S$. The second part, comprised between the values $H_S$ and $H_{ST}$ of the field is a portion of a parabola while the third part VI which extends beyond the value $H_{ST}$ is formed by a straight line of very slight inclination, the magnetic induction then tending towards a value $B_1$ which corresponds to the value 1 of the relative permeability.

It is important to indicate that this manner of simulating the characteristics of permeability and saturation can equally be adopted for remanent materials. In this case the portions of the curves will again be straight lines, hyperbolas and parabolas, but the equations thereof will be slightly less simple than for a non-remanent material.

Moreover, given that there are several possible definitions of the limit between the state of non-saturation and that of saturation of a medium with flux it is necessary to specify that in all that follows a non-saturated zone will be referred to when the point of action of this zone on the characteristic $\mu_r(|H|)$ is situated on the first portion I of the curve. On the contrary, a region will be referred to as totally saturated or more simply as saturated when its point of action is located on the third portion III of this cuve that is to say when its permeability is practically equal to that of vacuum. The hyperbolic part II corresponds to a state of partial saturation.

In the absence of current in the coil 16, the rotor 18 is located in one of its rest positions, for example that which is shown in FIG. 3 and is indicated by the point $S_1$. Each of the isthmuses $12_a$ to $12_d$ is then traversed only by a part of the flux $\Phi_A$ of the magnet 19 as shown diagrammatically by the induction lines $42_a$ and $42_b$ shown in FIGS. $6_a$ and $6_b$. It should be noted that in these figures, for reasons of clarity, the dimensional proportions, especially as regards the sizes of the isthmuses, have not been respected. Under these conditions, the narrowest isthmuses $12_a$ and $12_c$ are not usually saturated with flux, even partially, and the working point $M_{ac}$ on the characteristic $\mu_r(|H|)$ is then situated on the first portion I. It is the same for the second and fourth connecting parts $12_b$ and $12_d$. Nevertheless, the abscissa of the working point $M_{bd}$ of these latter will be lower than that of the point $M_{ac}$ since they have a larger size than that of the first and third isthmuses.

When a driving pulse, for example a positive one, which is capable of turning the rotor in the clockwise direction D, is applied to the coil 16, the latter generates in the stator 11 a flux $\Phi_B$ of increasing amplitude which passes from the first massive part $11_a$ to the second one $11_b$. Part of this flux remains in the stator and passes through the intermediate parts $21_a$ and $21_b$ as indicated by the induction lines $43_a$ and $43_b$ in FIG. $6_a$, while the other part traverses successively the third isthmus, the magnet and the first isthmus as shown by the line $43_c$.

As the flux $\Phi_B$ of the coil is added to that $\Phi_A$ of the magnet at the level of the first and third isthmuses, the point of action $M_{ac}$ thereof is displaced along the curve $\mu_r(|H|)$ in the direction of the increasing values of the amplitude of the field indicated by the arrow F and very rapidly attains the third part III of the curve. It should be noted that, from the point of view of the efficiency of the motor, it is advantageous that this saturation of the narrow isthmuses should be produced as quickly as possible. It is therefore advantageous to select for the isthmuses a width l such that, having regard to the value of the flux of the magnet, the point of action $M_{ac}$ will be located, in the absence of current in the coil, as near as possible to the point of connection between the first and second portions of the curve.

In the large isthmuses $12_b$ and $12_d$ the direction of the flux generated by the coil is opposite to that of the magnet. It follows that, when the flux $\Phi_B$ of the coil increases, the total flux at the level of these connecting parts first begins to decrease so as theoretically to reach the value zero and then to increase. The working point $M_{bd}$ is accordingly displaced first of all in the direction opposite to that of the arrow F and then in the direction indicated by the latter. The position which the point $M_{bd}$ can be caused to assume on the curve before the rotor begins to turn depends on numerous parameters such as the value of the flux of the magnet, the material of which the stator is composed, and in particular the widths of the isthmuses and the ratio thereof. If this ratio $l'/l$ is substantially equal to three or more it is almost certain that the point of action $M_{bd}$ will not move out from the first portion of the curve. On the contrary if the ratio $l'/l$ is smaller, of the order of two, the point $M_{bd}$ can traverse a part of the second portion II of the characteristic curve in the direction of the increasing values of the field so as to return thereafter rearwardly when the narrow isthmuses have attained saturation.

Figure 7:
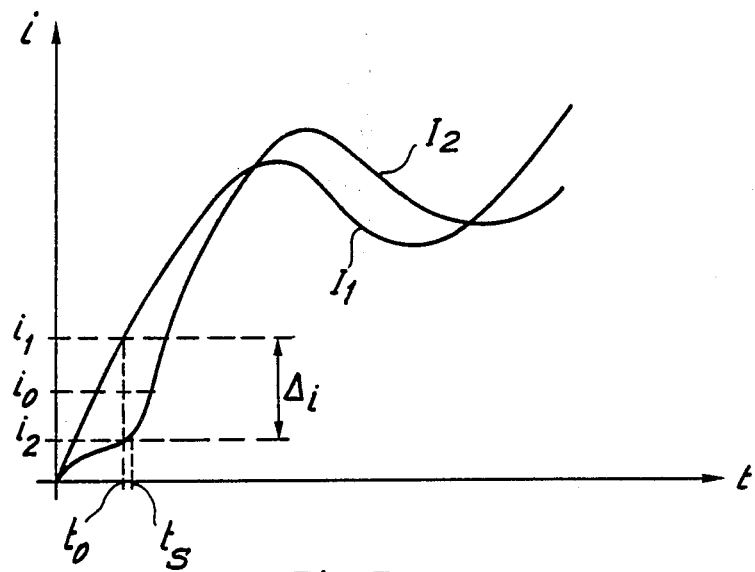
FIG. 7 is a diagram showing the difference in the form of the current in the coil of the motor of FIG. 3 according to whether the rotor is caused to rotate in one direction or the other.

Since the narrowest isthmuses $12_a$, $12_b$ become saturated very rapidly, the same occurs in the coil as in the case of the conventional motor of FIG. 1, that is to say the current increases very rapidly, practically from the beginning of the driving pulse, as shown by the curve $I_1$ in the diagram of FIG. 7. When the current attains a sufficient value, the rotor turns through 180° in the clockwise direction D to assume its other rest position in which the north pole of the magnet 19 is located opposite the point $S_2$ (FIG. 3).

It is clear that, in the course of this rotation, the working points $M_{ac}$ and $M_{bd}$ will not continue to occupy the positions in which they were located before the rotor began to turn and that they will be displaced along the permeability curve, since the values of the fields due to the magnet and the coil will vary at the level of the isthmuses and also in the massive parts of the stator and in the core of the coil. This development in the course of the dynamic phase of the operations of the motor which depends on numerous geometrical and physical parameters will not be described here because on the one hand this would lead to entering long and rather extensive theoretical considerations and on the other hand such a description is not necessary for the understanding of the invention.

When, after the application of the positive driving pulse to the coil, the rotor 18 is located in the second rest position $S_2$, the magnetic field H produced by the magnet at the level of each of the isthmuses $12_a$ to $12_d$ has the same value as when the rotor occupied its first stable position $S_1$, its direction being reversed. Because of this, the working points $M_{ac}$ and $M_{bd}$ of the isthmuses are located in the position that they occupied before this pulse.

When the motor receives a negative pulse, the coil generates an induction flux $\Phi_B$ extending from the second pole piece $11_b$ to the first pole piece $11_a$, which produces the same displacement of the working points $M_{ac}$ and $M_{bd}$ as in the case of the positive pulse, and therefore again in this case a quasi-instantaneous saturation of the first and third isthmuses $12_a$ and $12_c$ and an almost immediate rapid increase of the current in the coil. On the other hand, in view of the direction of the flux induced by this latter, the rotor is again caused to make a half revolution in the clockwise direction D and to return to its initial rest position $S_1$, that is to say the position which it occupied before the advent of the positive pulse.

Figures 6A, 6B:
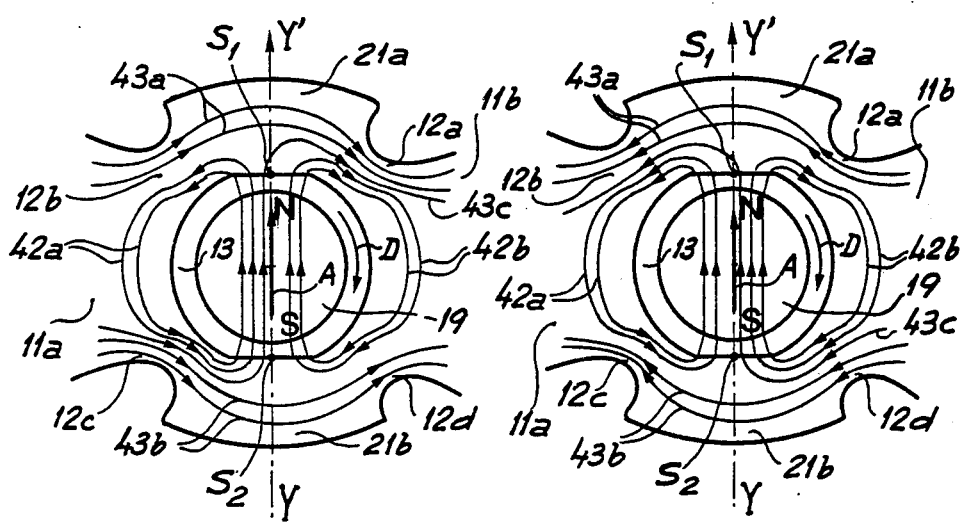
FIGS. 6a and 6b are diagrams which show the distribution of the magnetic flux of the coil and of the magnet in the stator near the central opening in the case where the motor operates in forward motion or in backward motion and which also enable the operation of the motor of FIG. 3 to be explained.

If, instead of then delivering to the motor a positive pulse which would continue causing the rotor to turn in the same direction, a negative pulse is again applied to it, the flux produced by the coil becomes added to that of the magnet in the wider isthmuses $12_b$, $12_d$, while in the narrow isthmuses these flux are in the opposite direction as shown in FIG. 6b. In this case, therefore, it is the point $M_{ac}$ which is displaced first in the direction opposite to that of the arrow F and then in the other direction. On the contrary the point $M_{bd}$ begins at once to be displaced in the direction of the increasing values of the amplitude of the field but, due to the difference in cross-section of the connecting parts, this displacement is less rapid than that of the point $M_{ac}$. There are then two possibilities. According as the ratio $l'/l$ is more or less high, either, there again, it is the point $M_{ac}$ which reaches the third portion III of the curve, or it is the point $M_{bd}$. It is not possible to specify in a general way the limit above which it is the narrow isthmuses that become saturated because it depends on numerous parameters and may vary from one motor to another due to variations in manufacture. Nevertheless it is practically certain that this will always be the case if the ratio $l'/l$ is substantially equal to three or more, at least for stepping motors intended to be fitted in timepieces.

As regards the working point of the isthmuses, when they are not saturated, it may according to the circumstances remain in the first portion of the characteristic curve or be caused to traverse a part of the second portion of the curve in the direction of the arrow F so as to return then rearwardly and remain in this second portion or return to the first portion.

Whether it is the narrow isthmuses $12_a$, $12_c$ or the wide isthmuses $12_b$, $12_b$ which become saturated, the value which the flux $101_B$ must attain in order to permit this saturation is higher than when the flux of the coil and that of the magnet are added together in the first and third connecting parts. It follows that the time $t_S$, during which the reluctance $R_{bb}$ of the magnetic circuit remains small in view of the coil and consequently during which the current i in this coil slowly increases, is greater, as shown by the curve $I_2$ in FIG. 7.

At the end of this time $t_s$ the current in the coil increases rapidly and, when it attains a sufficient value, the rotor is rotatably driven, but this time in the anti-clockwise direction.

If a pulse of polarity opposite to that of the preceding pulse, that is to say positive, is then applied to the motor, everything takes place in the same manner with the fields and flux reversed and the rotor completes a new step in the same direction.

For a reason which will appear clearly later, it is advantageous that the difference in the rate of increase in the current in the coil at the beginning of a driving pulse, according to whether it causes the rotor to rotate in one direction or the other, that it to say the divergence between the curves $I_1$ and $I_2$ (FIG. 7), should by sufficiently great to be able to be detected easily by an electronic circuit. For this purpose it is necessary that the ratio between the widths $l'$ and $l$ of the isthmuses should be sufficiently high, which explains the choice of a value greater than two and preferably substantially equal to three for the ratios $l'/l$. When the width $l'$ is about three times the width $l$, the time $t_S$ which the first and third isthmuses take to become saturated, when the motor is running in the reverse direction, it approximately ten times greater than the time which they require to reach saturation in the case of a rotation of the rotor in the clockwise direction, which is very adequate. Moreover, in order that the efficiency and the reliability of operation of the motor when running in the reverse direction should not be substantially affected, it is preferable that the time $t_S$ should not be too long. In this connection it should be noted that the fact of arranging matters so that the working point of the narrow isthmuses $12_a$, $12_c$, in the absence of current in the coil, is close to the junction between the first and second portions of the permeability curve not only has the advantage of making it possible to obtain a quasi-immediate saturation of these isthmuses when the rotor rotates in the clockwise direction D but also a substantial difference between the time of saturation when running forward and when running in reverse; the difference in length between the paths which the working point $M_{ac}$ is caused to traverse on the curve in order to reach the third portion III being so much the greater as the initial abscissa of this point is great.

Figure 8:
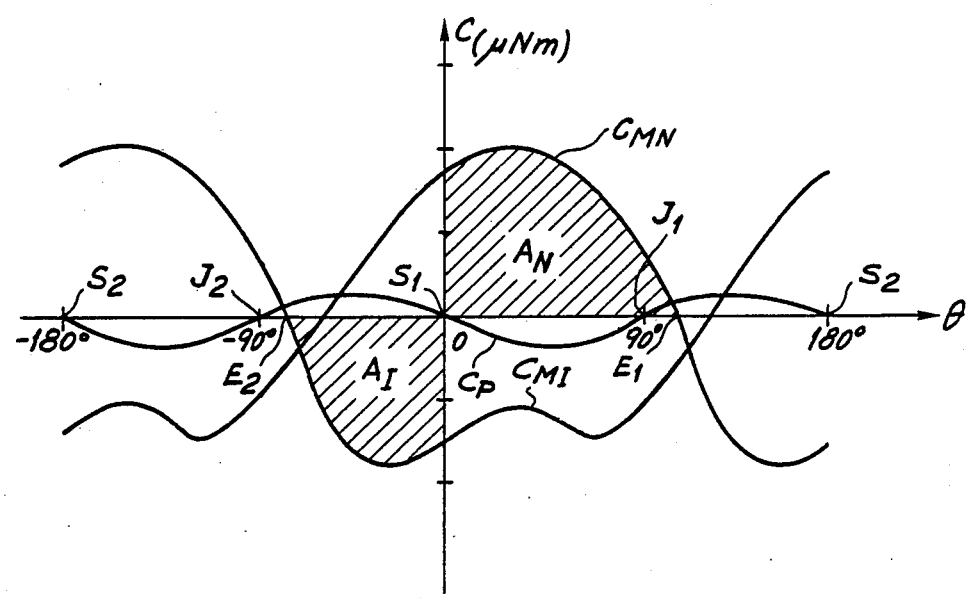
FIG. 8 is a diagram showing the variations, as a function of the angular position $\theta$ of the rotor, of the positioning torque and of the mutual magnet-coil torque obtained with the motor of FIG. 3 for each direction of rotation.

FIG. 8 shows the form of the torques to which the rotor 18 is subjected when it turns in the clockwise direction and in the opposite direction; the origin selected for the angle of rotation $\theta$ corresponds to the rest position $S_1$ in which the rotor is shown in FIG. 3. It should be noted that the curves which appear in this diagram are experimental curves.

Although, because of the cylindrical shape of the magnet 19, the positioning torque $C_p$ continues to have a sinusoidal shape, as in the case of the conventional motor of FIG. 1, this is not so for the mutual torque $C_{MN}$ when running forward, that is to say in the clockwise direction, nor especially for the mutual torque $C_{MI}$ in the backward direction.

It must be observed that the torques $C_{MN}$ and $C_{MI}$ have to a great extent the characteristics sought after. They maintain a high value until the rotor has turned through an angle distinctly greater than forty degrees and each of them has a maximum value after the rest position. Because of this, the energies which can be communicated to the rotor when running forward and backward and which are represented by the hatched areas $A_N$ and $A_I$ are substantial.

All the explanations that have been given in regard to the action of the mutual torque, the positioning torque and the resistant torque on the rotor as a function of the angular position of the latter and of the duration of the driving pulse for the conventional motor of FIG. 1, in the case of a rotation in the normal direction d, remain valid for the operation in the forward direction. It is sufficient to replace the small letters used to indicate the torques and the characteristic angular positions of the rotor by capital letters. The only difference is that the mutual torque $C_{MN}$ can only act in this case as a driving torque over an angle slightly greater than 90° instead of 145°. This does not really constitute a disadvantage since, there again, it is not often necessary to prolong the driving pulse until the rotor reaches the position $E_1$ when it starts from its rest position $S_1$ or the point $E_2$ if it is initially in its other rest position $S_2$, or even the corresponding positions $J_1$ and $J_2$ of unstable equilibrium in the absence of current in the coil, in order that the rotor can complete its step (see also FIG. 3).

As regards the operation in reverse, the mutual torque $C_{MI}$ can only act as a driving torque up to the point $E_2$ or $E_1$, that is to say over a little less than 90°, but the energy $A_I$ acquired by the rotor when it attains this position, is amply sufficient to enable it to overcome first of all the positioning torque $C_p$ and the resistance torque and then to terminate its step under the action of the torque $C_p$ and the residual kinetic energy.

The fact established experimentally that the axis X—X' of the mutual flux, on which the points $E_1$ and $E_2$ are located, does not coincide exactly with the axis N—N' which is perpendicular to the axis of static equilibrium Y—Y' can be explained by the asymmetry due to the difference in the widths of the isthmuses; the wider constrictions $12_b$, $12_d$ remain more permeable than the two others and offer less opposition to the opening out of the lines of force in the stator and the direction X—X' in which the flux concentration is maximal tends to diverge from the axis N—N'. It is possible to operate on the values of the angles $\alpha$ and $\beta$ which the directions V—V' and W—W' in which the isthmuses are located make with the axis Y—Y' as well as on the ratio $l'/l$ of the widths of the latter, so as to reduce this angular divergence between the axes X—X' and N—N' in order to increase the energy communicated to the rotor when it is running in the reverse direction at the expense of that when it is running in the forward direction or, on the contrary, so as to reduce it in order to favour the operation in the clockwise direction.

It is also to be noted that this asymmetry introduces a displacement between the theoretical rest positions and the actual positions; the static axis of equilibrium Y—Y' is not exactly perpendicular to the flats $20_a$ and $20_b$.

Figure 9:
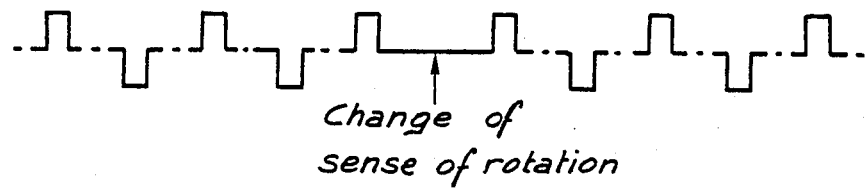
FIG. 9 shows the simple driving pulses which can be used to control the motor of FIG. 3 in forward motion and in reverse motion.

It follows from the preceding description that, in order to change the direction of rotation of the rotor, it is sufficient to apply to the coil two successive pulses of the same sign, that is to say to reverse the order of the succession of polarities of driving pulses as shown in FIG. 9.

This motor may therefore, in principle, be associated with a very simple control device which can take various constructional forms that are already known thanks to publications made prior to the present application, in particular through the U.S. Pat. No. 4,066,947 already referred to. Such a device will therefore not be described here. Nevertheless it is necessary to specify that, in the case of a horological application, the driving pulses of 7.8 ms generally employed for controlling conventional stepping motors with only one direction of rotation should be replaced by pulses of a shorter duration, of the order of 5 to 6 ms., since these pulses only have to drive the rotor through an angle equal at most to about 90° instead of 145°.

The simplicity of the control circuits is not the only advantage due to the fact that the motor can be supplied in both directions by simple pulses of alternating polarity. This also makes it possible to guarantee a wider working range and a greater operational reliability than in the systems which rely upon trains of composite pulses, which may or may not be balanced, not only because the risk is eliminated that one pulse may not be applied at a good moment and/or that its duration is unsuitable in view of the modifications made in the load conditions and the variations inherent in the manufacture, but also for the following reason: if a driving pulse is prolonged after the rotor has attained the position $E_1$ or $E_2$, whether while it is running forward or backward, which may frequently occur when the motor is supplied with pulses of a fixed duration provided in order to ensure correct functioning of the motor under the worst possible load conditions, the mutual torque acts as a braking torque which can operate over a still greater angle than in the case of a conventional motor, and hence there is a certain automatic regulation and a better control of the motor at high frequencies.

This motor however continues to exhibit one of the disadvantages referred to in connection with known reversible motors: the possibility of an unintentional reversal of its direction of rotation. This defect is particularly tiresome in the case where the motor is intended to be fitted in a wrist-watch. The failure of one step, resulting for example from an excessive load or an accidental displacement due to a shock or an external magnetic field are then very probable.

The invention also enables this problem to be solved by associating with the motor a control device capable of providing, at the beginning of the application of each driving pulse to the coil, the direction in which the rotor is preparing to turn, to interrupt this pulse if the direction is incorrect and to send a new pulse of the opposite polarity in order to cause the rotor to turn in the correct direction.

The principle of determination of the direction of rotation of the rotor is the following: referring again to FIG. 6$_a$, it will be seen that, if the flux generated by the coil, indicated by the induction lines 43$_a$, 43$_b$ and 43$_c$, maintains the same direction which corresponds to a positive pulse which is designed to cause the rotor to turn in the clockwise direction D and if, on the contrary, the direction of the flux of the magnet is reversed due to the fact that the rotor no longer occupies the position in which it is shown but that in which the north pole of the magnet is opposite the point S$_2$, the rotor will be driven in the anti-clockwise direction, that is to say in the direction opposite to that in which it should in fact rotate. Moreover, the flux of the magnet and that of the coil becoming added together in the wider isthmuses, the current in the coil will have the form of the curve I$_2$ (see FIG. 7). In a general way, if the motor should operate running forward, the rotor will rotate in the desired direction if the first and third isthmuses. 12$_a$, 12$_c$ are saturated practically immediately (curve I$_1$). On the contrary for running in the reverse direction, the motor will function correctly if these same isthmuses or the two others 12$_b$, 12$_d$ according to the value of the ratio l'/l are only saturated at the end of a period of time t$_S$ which is not negligible (curve I$_2$).

It is therefore possible, by measuring, at the end of a predetermined period of time t$_0$ after the beginning of each driving pulse, the value of the current i in the coil and by comparing with a threshold value i$_0$ comprised between the values i$_1$ and i$_2$ at the same instant of the currents in the case of a quasi-instantaneous saturation and a delayed saturation of the isthmuses, to determine, while the rotor is still stationary, whether the direction in which it is preparing to turn is correct. The value of the threshold i$_0$ is preferably the mean value of i$_1$ and i$_2$. Any accidental reversal of the direction of rotation of the rotor can thus be avoided.

Figure 10:
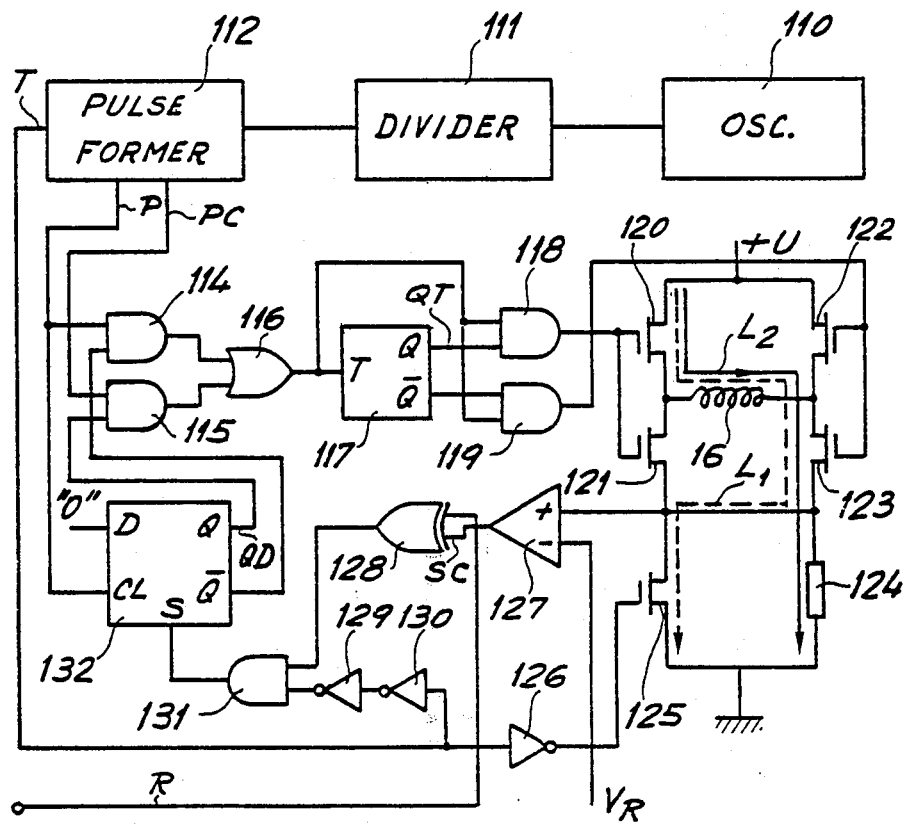
FIG. 10 is the diagram of an example of a control device which can be associated with a stepping motor according to the invention.

FIG. 10 shows, in the case of the application to an electronic watch, a possible embodiment of the control device which is designed to be associated with the motor and is capable of supplying the latter with driving pulses of polarity corresponding to the initial position of the rotor and to the selected direction of rotation.

This device comprises a quartz oscillator 110 which delivers a signal of standard frequency, a frequency divider 111 which produces, in response to the signal from the oscillator, a time base signal of precise frequency, for example of 1 Hz, and a pulse forming circuit 112 which produces from the time base signal and from various other signals taken from the outputs of the intermediate stages of the frequency divider, on the one hand, normal control pulses P of predetermined duration, preferably 5 to 6 milliseconds, and correction control pulses PC of the same duration as the normal pulses, but delayed with respect to the latter by a predetermined period of time, for example by 62 milliseconds. Normal control pulses P are applied to one of the two inputs of an AND gate 114, while one of the two inputs of another AND gate 115 receives the correction pulses PC. The outputs of the AND gates 114 and 115 are connected to the two inputs of an OR gate 116 the output of which is connected on the one hand to the input of a T-type flip-flop 117 which changes state each time its input passes from the logical state "0" to the logical state "1" and on the other hand to the inputs of two AND gates 118 and 119, the other inputs of these AND gates 118 and 119 being connected respectively to the outputs Q and $\overline{Q}$ of the T-type flip-flop 117. The coil 16 of the motor is connected in a conventional manner in a bridge circuit containing four MOS transistors 120 to 123. The transistors 120 and 121, of the types p and n respectively have their control electrodes connected to the output of the AND gate 118, while those of the p-type transistor 122 and of the n-type transistor 123 are connected to the output of the gate 119. Moreover, the transistors 120 and 122 have their sources connected to the positive pole +U of a voltage supply source (not shown), while the sources of the transistors 121 and 123, which are connected together, are connected indirectly to earth.

It is to be noted that the control circuit of the motor formed by the elements 117 and 123 is often to be found in the case of conventional unidirectional single phase motors.

Between the sources of the transistors 121 and 123 and earth there is provided a measuring resistor 124 of high value, to the terminals of which is connected a transmission gate 125 constituted by a p-type MOS transistors which enables the resistor 124 to be short-circuited except during a short instant, at the moment t$_0$ when a measurement of the current in the coil 16 needs to be made. For this purpose, the transistor 125 receives on its control gate, via an inverter 126, very short test pulses T, the duration of which may be from 15 to 60 microseconds and which are produced by the pulse-forming circuit 112.

The terminal of the resistor 124, which is connected to the sources of the transistors 121 and 123, is connected to the non-inverting input of a comparator 127, the other input of which receives a reference voltage V$_R$ proportional to the threshold value i$_0$ (FIG. 7). The output of the comparator 127 is connected to one input of an EXCLUSIVE OR gate 128, the other input of which receives a signal R which controls the direction of rotation of the motor and which can be generated for example by a manual control switch (not shown) with which the watch is provided. The output of the EXCLUSIVE OR gate 128 is connected to one of the two inputs of an AND gate 131, the output of which is connected to the setting input S of a D-type flip-flop 132.

The AND gate 131 receives on its other input the delayed test signal T via two inverters 129, 130. This delay makes it possible to prevent the rapid transient states of the EXCLUSIVE OR gate, for example the passage of one of its inputs from the state "0" to the state "1", during the test on the current, from acting on the flip-flop 132. Moreover, the D-type flip-flop 132 receives on its clock input CL the normal control pulses P, while its input D is maintained permanently in the logical state "0". Finally, the outputs Q and $\overline{Q}$ of this D-type flip-flop 132 are connected respectively to two other inputs of the AND gates 115 and 114.

Figure 11A:
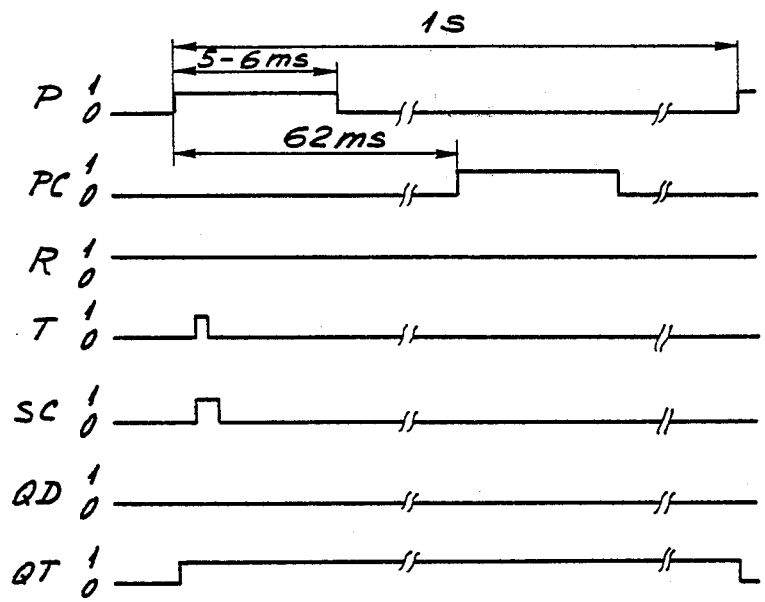
FIGS. 11a and 11b are diagrams representing the form of the signals which appear at different points of the control device of FIG. 10.
Figure 11B:
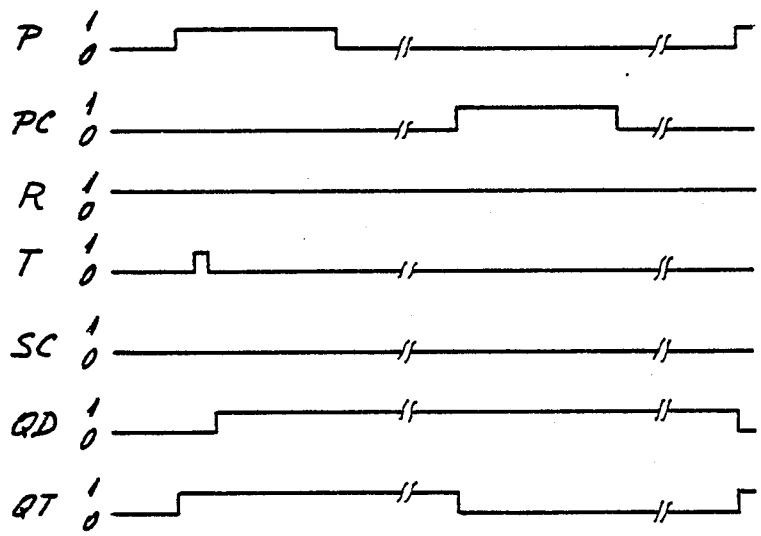

The operation of the circuit which has just been described will now be explained with reference to the diagrams of FIGS. 11$_a$ and 11$_b$ which show the form of the signals at different points in the circuit, in the case where polarity of the driving pulse applied to the coil corresponds to the correct direction of rotation and in the contrary case respectively. In these diagrams are represented the normal control pulses P and correction pulses PC, the signals S and T, as well as the signals SC at the output of the comparator 127, QD at the output Q of the D-type flip-flop and QT at the output Q of the T-type flip-flop.

It is assumed that, at the initial instant selected for this explanation, which occurs before the appearance of a normal control pulse P at the output of the pulse-forming circuit 112, the outputs Q of the T-type flip-flop 117 and of the D-type flip-flop 132 are in the state "0" and, moreover, that the signal R which controls the direction of rotation is in the state "1" which corresponds to an instruction to run forward. All the outputs of the AND gates of the circuit are in the state "0" and the transistors 120 and 122 are blocked. On the contrary, the transistors 121 and 123 are conducting and the coil 16 is short-circuited. The transmission gate 125 is also open and the output of the comparator 127 is in the logical state "0". When a normal control pulse P is produced by the forming circuit 112, the AND gate 114, the input of which is connected to the output $\bar{Q}$ of the D-type flip-flop 132, is already at "1", becomes open, which, by the intermediary of the OR gate 116 causes the input T of the flip-flop 117 and consequently its output Q to change over from "0" to "1". The AND gate 118 then becomes transmissive while the AND gate 119 remains closed due to the fact that the state of its inputs has only been inverted. The transistor 120 then becomes conductive while the transistor 121 is blocked and a current begins to circulate in the coil following the path indicated by the line $L_1$, the measuring resistance 124 being always short-circuited by the transistor 125. The state of the outputs of the other elements of the circuit including the D-type flip-flop 132 remains unchanged.

At the end of a period of time $t_0$, after the appearance of the normal control pulse, which may be selected between 0.5 and 1 millisecond according to the characteristics of the motor, the forming circuit 112 delivers a test pulse which closes the transmission gate 125 for a brief instant. The current is then constrained to pass momentarily into the measuring resistor 124. Two cases can then arise. If the voltage at the terminals of the resistor 124, which is proportional to the current in the coil, is higher than the reference voltage $V_R$, which signifies that the rotor is preparing to rotate effectively in the clockwise direction, the output of the comparator 127 passes to the state "1". This signal has the effect of causing the output of the EXCLUSIVE OR gate, which is in the state "1", to pass to the state "0" and to close the AND gate 131 which does not transmit the delayed test pulse T. No signal appearing at the positioning input of the D-type flip-flop 132, the state of the latter remains unchanged and the normal control pulse is transmitted completely to the control circuit, the motor then performing its step owing to the application to the coil 16 of a normal driving pulse. The correction control pulse which will subsequently appear is shut off by the AND gate 115. Moreover, after the application of the driving pulse, all the elements which have not retained it have reverted to their original state except the T-type flip-flop which remains in its operational state until a fresh pulse appears at its input.

If on the contrary, at the time of the measurement, the voltage at the terminals of the resistor 124 is lower than the reference voltage, the output of the comparator 127 remains at "0" and that of the EXCLUSIVE OR gate 128 remains at "1". The AND gate 131 then transmits the test pulse T to the setting input S of the D-type flip-flop. When this input S, which has been momentarily brought to the state "1", returns to "0", the output Q of the flip-flop passes to "1" and the output $\bar{Q}$ to "0", which has the effect of closing the AND gate 114 which ceases to transmit the normal control pulse and of causing the AND gate 115 to open, which gate then allows the correction control pulse to pass when it is produced. The rising edge of this pulse causes the flip-flop T to switch, which has the effect of opening the AND gate 119, the AND gate 118 being closed. The transistor 121 and 122 then being conducting and the transistors 120 and 123 blocked, the coil 16 receives a correction driving pulse having a polarity opposite to that which has begun to be applied to it under the action of the normal control pulse. The arrival of the following normal control pulse returns the D-type flip-flop 132 to its rest condition and causes the outputs Q and $\bar{Q}$ of the T-type flip-flop 117 to return to "1" and "0" respectively, the motor then receiving a normal driving pulse having a polarity opposite to that of the correction driving pulse which preceded it.

The same process is repeated for each control pulse. Each time the rotor does not assume the correct rest position for rotating in the correct direction, the motor will be driven by a correction driving pulse of the same sign as the driving pulse which should have in fact caused it to rotate a second before and the order of succession of the polarities of the normal driving pulses which it will receive later will be reversed from that of the pulses which it received before, assuming naturally that the signal controlling the direction of rotation remains at "1".

The operation of the device is altogether similar when the motor has to rotate in the anti-clockwise direction. The signal R being then at "0", the output of the EXCLUSIVE OR gate 128 is normally at "0"; it remains so and consequently no correction control signal will be applied to the input S of the D-type flip-flop 132 so long as the current in the coil at the moment of the measurement remains smaller than the value of the threshold $i_0$, that is to say that the motor will prepare to turn in the correct direction. On the contrary, in the case where this current is larger than $i_0$, the output of the comparator 127 passing from "0" to "1", that of the gate 128 will also pass to "1", and the gate 131 will transmit the delayed test pulse T. The appearance of this correction control signal at the input S of the D-type flip-flop will produce the shutting off of the normal control pulse to the control circuit and consequently the application to the motor of a correction driving pulse and a reversal of the order of succession of the polarities for the subsequent normal driving pulses.

It is to be noted that the frequency of 1 Hz envisaged in the previous explanations is that which corresponds to the normal operating conditions of the watch. In fact, as has already been indicated, the use of a reversible motor is essentially intended to enable a correction or modification of the time information to be made in both directions, which generally has to be done with pulses of distinctly higher frequency, but this produces no change in the operation of the circuit except that, in this case, the delay of the pulses PC with respect to the pulses P should be distinctly less than 62 milliseconds and will depend naturally on the frequency of the correction signal.

It must also be observed that, like the motor with which it is associated, the control device remains very simple. The invention therefore makes it possible to provide a motor assembly, stepping motor plus control device, which is very inexpensive and perfectly reliable.

Moreover, it is clear that it would be possible to produce a perfectly symmetrical reversible motor in which four isthmuses of the same width l are provided. This would enable identical performances to be obtained in both directions. On the other hand the phenomenon of differential saturation of the connecting parts would no longer be present and this would preclude the simple means which has just been described for avoiding any unintentional reversal of the direction of rotation of the rotor. In fact, one would then have a quasi-instantaneous saturation of the first and third isthmuses $12_a$, $12_c$ in the case of running forward and of the second and fourth isthmuses for running in the reverse direction. Because of this, the current in the coil would always have the form $I_1$.

In fact, since the motor in a timepiece is made to operate in reverse only very rarely, it is not a serious disadvantage for the output of the motor to be slightly lower in this direction than when running forward. On the contrary, it is more favourable for operation in the clockwise direction. This is the reason why the isthmuses are arranged so that the narrower ones are saturated immediately when running forward. In fact, a rapid increase in the current, practically at the beginning of a driving pulse, enables a mutual torque to be obtained very rapidly which is sufficient to cause the rotor to turn and consequently to achieve a better efficiency than when the current increases slowly during an appreciable period of time $t_S$.

Nevertheless, the solution of a symmetrical motor may be suitable for other applications.

FIGS. 12 to 15 show four other possible embodiments of the motor according to the invention. In these figures elements identical with or corresponding to those of FIG. 3 are indicated by the same numerals or letters.

Figure 12:
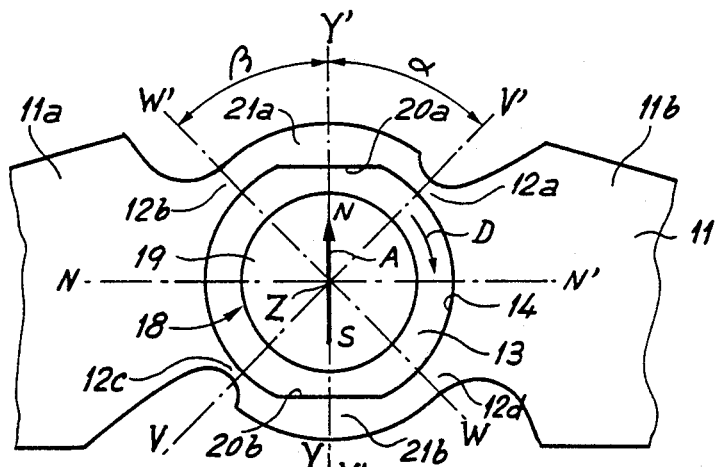
FIGS. 12 to 15 are partial diagrammatic plan views of four other possible embodiments of the stepping motor according to the invention.

The motor of FIG. 12 is different from the motor of FIG. 3 in fact that there is no longer an isthmus between the first intermediate part $21_a$ and the massive part $11_a$ or between the second intermediate part $21_b$ and the pole piece $11_b$. Moreover, if the flats $20_a$ and $20_b$ are disregarded, the two intermediate parts $21_a$ and $21_b$ have a substantially uniform width of between twice and four times that of the first and third connecting parts $12_a$, $12_c$ which are always constituted by isthmuses. This is the equivalent of saying that the intermediate parts have in this case the same cross-section as the second and fourth connecting parts. This embodiment is less advantageous than that of FIG. 3. In fact, the motor may be mechanically more fragile since the cross-section of the intermediate parts should be relatively small, while in the embodiment previously described, this cross-section is necessarily greater, in the same way moreover as the shape of the intermediate parts is in fact unimportant because the flux in these parts is conditioned by that which is present at the level of the isthmuses. It is to be noted that the embodiments of FIGS. 13 to 15 have more or less this same disadvantage.

Figure 13:
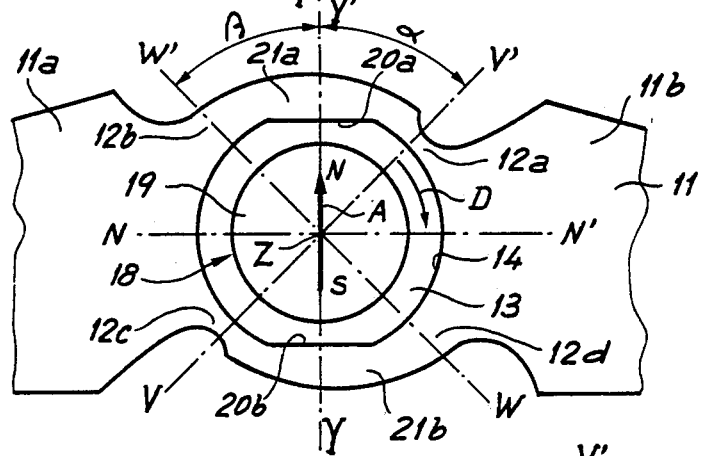

The difference between the motor of FIG. 13 and that of FIG. 12 consists in the fact that the intermediate parts $21_a$ and $21_b$ are of a width which is not substantially constant, but decrease as they extend from the second and fourth connecting parts $12_b$, $12_d$ towards the isthmuses $12_a$, $12_c$, the ratio between this width and that of the isthmuses being always between two and four.

Figure 14:
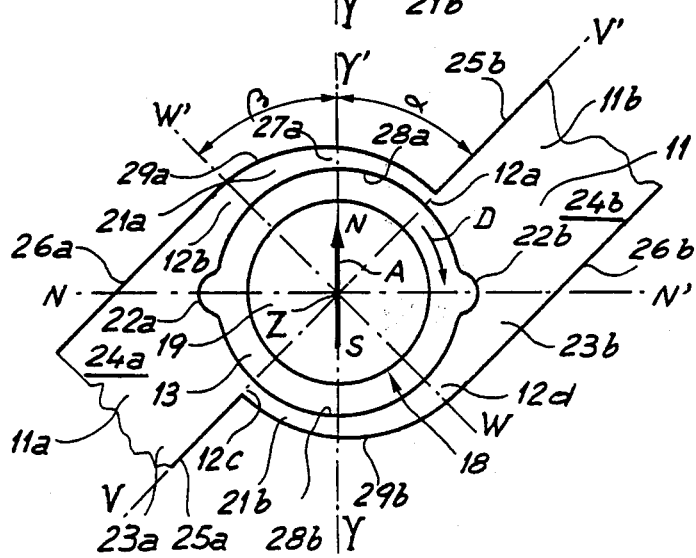

FIG. 14 shows a particular shape of the stator 11 which makes it possible to produce a motor with two isthmuses and intermediate parts of decreasing width as in the case of FIG. 13.

In this embodiment, the central opening retains the form of a cylinder of revolution centred on the axis Z of rotation of the rotor 18. On the contrary, the positioning means which determine the rest positions of the rotor are constituted by slots $22_a$, $22_b$ formed in the interior wall surface 14 and located on a diameter N—N' substantially perpendicular to the axis of static equilibrium Y—Y'. It is to be noted that the replacement of the flats $20_a$, $20_b$ (FIGS. 3, 12, 13) by slots does not in fact answer to any need and that this substitution could equally well take place in the embodiments previously described.

Although the stator 11 is made in this case in only one piece, this stator may be considered as constituted by two portions $23_a$ and $23_b$. The two portions $23_a$, $23_b$ are symmetrical with respect to the axis of rotation Z of the rotor and are located one on each side of a straight line which is angularly inclined with respect to the axis of static equilibrium Y—Y' in the clockwise direction D.

For reasons which will become clear later, this straight line and the angle of inclination will be indicated respectively by V—V' and $\alpha$.

The first portion $23_a$ may be divided into two surfaces. The first $24_a$ of these surfaces has the form of a rectangle, one corner of which is located on the axis Z of rotation of the rotor and one side $25_a$ of which is coincident with the straight line V—V' and which has cut out from it at 90° circular sector which is likewise centred on the axis Z in such a manner as to form a first quarter of the central opening 13.

The side $26_a$ of the rectangle, which is parallel to the side $25_a$, is naturally separated from the latter by a distance greater than the radius of the central opening.

The second surface $27_a$, which is in the form of a horn, is delimited by a circular inner edge $28_a$ which constitutes a part of the inner wall surface and delimits a second quarter of the central opening 13 and by an outer edge $29_a$ which, on leaving the straight line V—V', diverges progressively from the inner edge $28_a$ so as to joint the edge $26_a$ of the first surface. This outer edge $29_a$ may be circular, but this is not necessary.

Owing to the symmetry with respect to the axis Z, all that has been said in regard to the portion $24_a$ is equally true for the portion $24_b$, subject to the replacement of the suffix a by b.

The size of the second surfaces $27_a$ and $27_b$ at the locations of the connections between the two portions $23_a$, $23_b$, which are naturally level with the straight line V—V', is chosen so as to be sufficiently small for these junction zones $12_a$, $12_b$ to be able to be very rapidly saturated with flux and for them to constitute therefore the first and third connecting parts. Moreover, although the transition from a narrow part to a massive part is less abrupt than in the case of the embodiments described previously when the limits between the first and second surfaces of the portions of the stator are crossed, the first surfaces $24_a$, $24_b$ may be considered to constitute the pole pieces $11_a$ and $11_b$ and the second and fourth connecting parts $12_b$, $12_d$ may be considered a being located at the junctions between the first surfaces and the second surfaces $27_a$, $27_b$ which constitute the intermediate parts. The sum of the angles $\alpha$ and $\beta$ is therefore equal to 90°.

Figure 15:
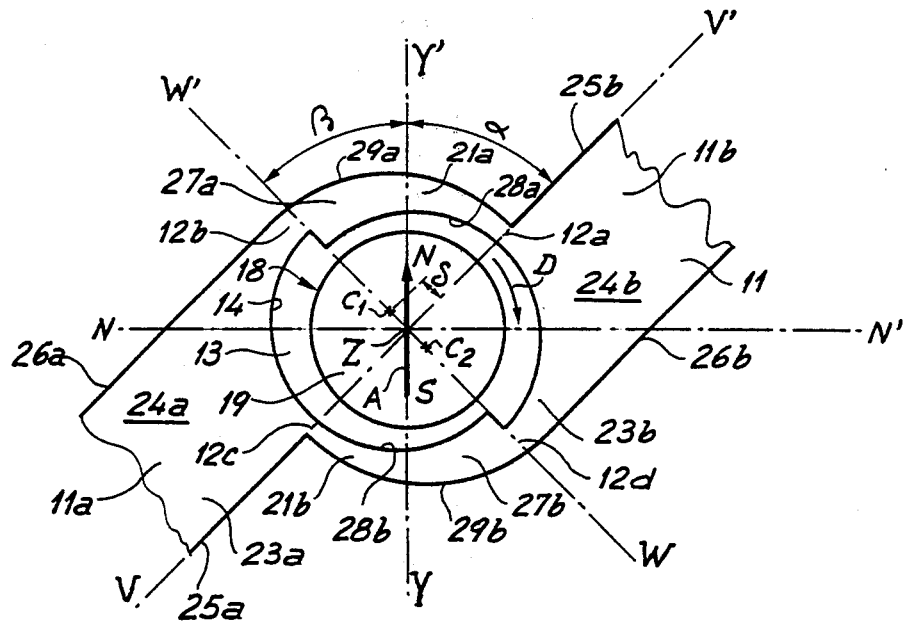

A modified form of the motor of FIG. 14 is shown in FIG. 15 in which the corresponding elements are designated by the same reference numerals. The circular sector cut out from the rectangular surface $24_a$ in this case no longer has as its centre the corner of the rectangular which is located on the axis Z of rotation of the rotor 18, but a point $C_1$ located on the side of the straight line V—V' on which the first portion $23_a$ is situated and is offset by a distance δ with respect to the axis Z in the direction W—W' perpendicular to the rectangular surface $24_b$ of the second section $23_b$ has for its centre a point $C_2$ symmetrical to the point $C_1$ in relation to the axis Z. In addition, the inner edges $28_a$ and $28_b$ of the second surfaces $27_a$ and $27_b$ are always circular but have as their respective centres the points $C_2$ and $C_1$. The central opening 13 is thus formed by two semi-cylinders of the same radius and offset with respect to each other by a distance 2δ in the direction W—W'. As in conventional motors with a two-piece stator, the offsetting makes it possible to ensure the positioning at rest of the rotor 18 in the direction Y—Y' of minimum reluctance without it being necessary to provide other means such as slots or flats. Finally, the width of the junctions between the first and second surfaces which are located on the straight line W—W' and which constitute the second and forth connecting parts $12_b$, $12_d$ is selected in this case so that the ratio other connections $12_a$, $12_c$ is between two and four, preferably in the region of three. This embodiment may be considered as a special form of the motor with four isthmuses.

Figure 16:
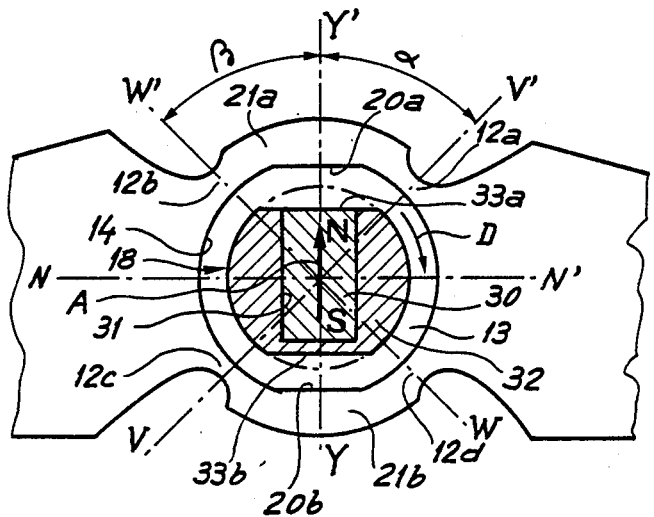
FIG. 16 shows diagrammatically and partly in plan a possible variant for the motors of FIGS. 3 and 12 to 15, shown in the case of the embodiment of FIG. 3.

In the case of the motor shown in FIG. 16, the stator 11 is identical with that of the embodiment of FIG. 3. However, the rotor 18 no longer has a cylindrical magnet with diametral magnetisation, but a magnet in the form of a bar 30 which may for example be parallelepipedal or cylindrical and which is magnetised along its longitudinal axis. This magnet 30 is housed in a cavity 31 in the shaft 32 of the rotor. This shaft 32 is made of a plastic material and has two plane surfaces or two parallel flats $33_a$, $33_b$ designed to facilitate the manufacture of the rotor.

Figure 17:
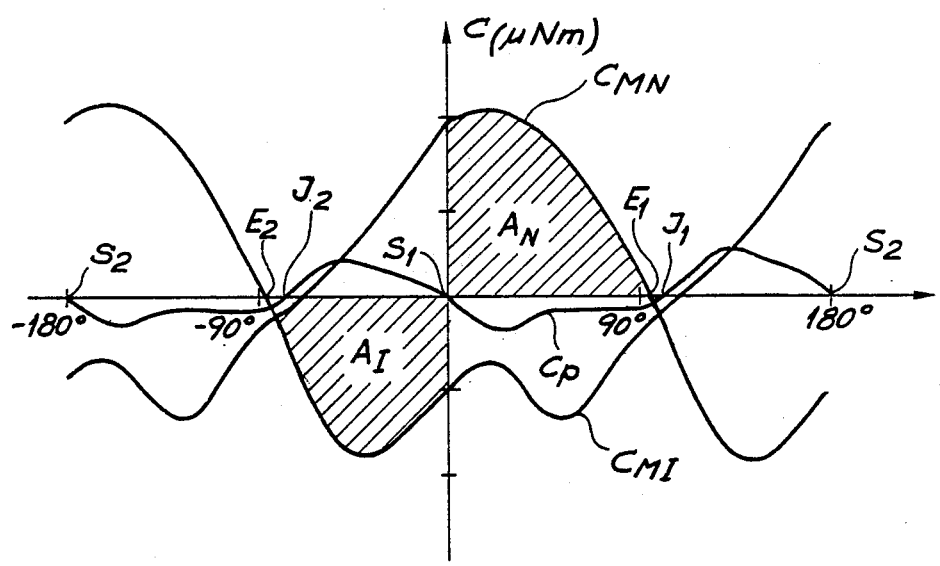
FIG. 17 is a diagram similar to that of FIG. 8 showing the torques obtained with the motor of FIG. 16.

Such a rotor is described in detail and its various advantages are indicated, in connection with a unidirectional motor, in our published British patent application No. 2,071,429, filed on Feb. 4, 1981. It is therefore sufficient to state here that a rotor so formed makes it possible to obtain, as shown in FIG. 17, a positioning torque $C_p$ the form of which is no longer sinusoidal but the inclination of which near the rest positions is steeper than in the case of a cylindrical rotor. The rest positions $S_1$ and $S_2$ of the rotor are thus better defined. In addition, the displacement which is to be found when the rotor is subjected to a resistant torque is reduced and the field of operation of the motor is enlarged.

FIG. 17 shows for each of the two directions of rotation, the form of the mutual torques $C_{MN}$ and $C_{MI}$ which have been obtained with the motor of FIG. 16.

It is clear that the substitution of the rotor with a bar magnet for that with a cylindrical magnet is not restricted to the embodiment of FIG. 3 and that it is possible in all cases, particularly for the motors described with reference to FIGS. 12 to 15.

In all the embodiments that have been described, the phenomenon of differential saturation of the connecting parts which is used to determine the direction of rotation of the rotor at the beginning of a driving pulse is obtained as a result of the geometrical form of the stator, because this is in fact the simplest means of achieving the object sought after. There are nevertheless other possibilities, for example to pierce radial holes of different cross-sections in the directions V—V' and W—W', to use different ferromagnetic materials for the production, on the one hand, of the pole pieces and intermediate parts and, on the other hand, of the connecting parts etc. or to combine certain of these means. In general, it is sufficient that the connecting parts should have a magnetic behaviour similar for example to that of the isthmuses of the motor of FIG. 3 so far as their permeance or their relative permeability is concerned.

Another important remark is that it is not essential, in order that the motor should function, that the connecting parts should attain, when running forward and/or when running backward, the saturation exactly as has been defined above. It is sufficient that these zones should have a substantial reduction in permeability when a driving pulse appears so that that part of the flux generated by the coil which passes through the intermediate parts $21_a$, $21_b$, and which is in fact lost, remains sufficiently weak for the useful part of this flux which passes through the magnet to be able to attain a value sufficient to bring about the rotation of the rotor. Nevertheless, it is clear that this does not take place in the sense of an improvement in the performances of the motor.

The invention is naturally not limited to the embodiments which have been described or envisaged. In particular, it is possible to give the central opening of the stator other forms, for example a slightly elliptical shape, the short axis of the ellipse being oriented in the direction Y—Y'; supplementary positioning means such as flats, slots or combinations thereof are not then necessary.

In the same way, the stator may not be monobloc but formed, for example, of stacked plates or several elements connected together, especially for non-horological applications.

Moreover, the control device of the motor may assume forms other than that described. It may be arranged for producing chopped driving pulses, that is to say each constituted by a series of elementary pulses separated by periods during which the coil is short-circuited.

It is equally possible to modify the control device in such a manner as to make it capable of ensuring a control of the energy of the driving pulses as a function of the load on the motor and more particularly to a qualified indirect control which makes use of the detection of the rotation or non-rotation of the rotor, since the circuit provided for determining the direction of rotation of the rotor at the beginning of a pulse makes it possible to know whether the latter has or has not completed its step in response to the preceding pulse, on condition naturally that a system is provided which makes it possible to differentiate between an accidental displacement and an absence of rotation due to a driving pulse of insufficient energy, taking into account the load on the motor.

What is claimed is:
1. A stepping motor assembly comprising:
   a bidirectional stepping motor having
     a rotor including a permanent magnet with at least one pair of opposed magnetic poles which define an axis of magnetization,
     a stator provided with a central opening delimited by an inner wall surface and within which said rotor is mounted for rotation about an axis, said stator comprising opposed first and second pole pieces which partly surround the rotor and are connected to each other on one side of said rotor by means of a first intermediate part and first and second connecting part between said first intermediate part and said second and first pole pieces respectively, and on the other side of said rotor by means of a second intermediate part and third and fourth connecting parts between said second intermediate part and said first and second pole pieces respectively, said connecting parts being arranged to form areas having a low magnetic permeance with regard to said pole pieces, a coil coupled magnetically to said stator, and positioning means for defining two rest positions of said rotor in which said axis of magnetization is directed along an axis of static equilibrium which intersects said intermediate parts; and a control device for delivering driving pulses to this motor.

2. A stepping motor assembly according to claim 1, wherein said first and third connecting parts, respectively said second and fourth connecting parts, are located substantially symmetrically in relation to said axis of rotation of the rotor in a direction inclined to said axis of static equilibrium at an angle of between 30° and 60°, in a direction corresponding to a first or a second direction of rotation of the rotor.

3. A stepping motor assembly according to claim 2, wherein the directions in which said connecting parts are located each form with said axis of static equilibrium an angle substantially equal to 40°.

4. A stepping motor assembly according to claim 2, wherein said connecting parts are arranged so that the first and the third of them are saturated with magnetic flux and that their permeability thus attains practically that of empty space, when the coil generates in the stator, in response to a driving pulse, a magnetic field which enables the rotor to be made to turn in said first direction of rotation.

5. A stepping motor assembly according to claim 4, wherein said connecting parts are arranged so that the second and the fourth of them are saturated with magnetic flux when the coil generates in the stator a magnetic field which enables the rotor to be made to turn in said second direction of rotation.

6. A stepping motor assembly according to claim 5, wherein said connecting parts are such the saturation of the first and third of them in the case of a rotation of the rotor in said first direction is more rapid than that of the second and fourth of them when the rotor is caused to turn in said second direction of rotation.

7. A stepping motor assembly according to claim 4, wherein said connecting parts are arranged so that the first and third of them are equally saturated with magnetic flux when the magnetic field produced by the coil enables the rotor to be made to turn in said second direction of rotation.

8. A stepping motor assembly according to claim 4, wherein said stator is made in one piece of a substantially uniform thickness, of a material of high magnetic permeability, and wherein said first and third connecting parts are constituted by isthmuses of the same width.

9. A stepping motor assembly according to claim 8, wherein said second and fourth connecting parts are also constituted by isthmuses.

10. A stepping motor assembly according to claim 9, wherein the isthmuses which form said second and fourth connecting parts have a width substantially equal to that of the isthmuses which form said first and third connecting parts.

11. A stepping motor assembly to claim 9, wherein the isthmuses which form said second and fourth connecting parts have a width of between twice and four times that of the isthmuses which form said first and third connecting parts.

12. A stepping motor assembly to claim 11, wherein the isthmuses which form said second and fourth connecting parts have or width which is substantially equal to three times that of the isthmuses which form said first and third connecting parts.

13. A stepping motor assembly according to claim 8, wherein on the one hand, said first intermediate part and said second connecting part and, on the other hand, said second intermediate part and said fourth connecting part are constructed so as to form two portions of the stator having an almost uniform width of between twice and four times that of the isthmuses which constitute said first and third connecting parts.

14. A stepping motor assembly according to claim 8, wherein, on the one hand, said first intermediate part and said second connecting part and, on the other hand, said second intermediate part and said fourth connecting part are constructed so as to form two portions of the stator having a width which increases approximately uniformly from the isthmuses which constitute said first and third connecting parts, this width remaining between twice and four times that of said isthmuses.

15. A stepping motor assembly according to claim 1, wherein said central opening has essentially the form of a cylinder of revolution having an axis coincident with the axis of rotation of the rotor.

16. A stepping motor assembly according to claim 15, wherein said positioning means comprise two flats which are diametrically opposite and substantially parallel to each other and are provided on said inner wall surface of the stator, said axis of static equilibrium being appriximately perpendicular to these flats.

17. A stepping motor assembly according to claim 15, wherein said positioning means comprise two recesses which are diammetrically opposite each other and formed in said inner wall surface of the stator, said axis of static equilibrium being substantially perpendicular to a straight line joining these recesses.

18. A stepping motor assembly according to claim 1, said permanent magnet is made in the form of a cylinder of revolution which is magnetised diametrically.

19. A stepping motor assembly according to claim 1, wherein said permanent magnet is made in the form of a bar which is magnetised along its longitudinal axis.

20. A stepping motor assembly according to claim 6, 7, 11, 13 or 14, wherein said control device comprises:

signal-generating means for producing signals at the driving frequency of the motor;

a pulse-forming circuit coupled to said signal-generating means for providing normal control pulses;

a control circuit for delivering normally to said coil of the motor, in response to said normal control pulses and to a signal of control of the direction of rotation, normal bipolar driving pulses in an order of succession corresponding to the direction in which said rotor should turn;

means for determining the direction of rotation of the rotor which compare, at a predetermined instant after the beginning of each normal driving pulse, the value of the current in said coil with a threshold value and furnish a signal representative of the direction in which said driving pulse tends to cause said rotor to turn;

means for comparing the signal furnished by said means for determining the direction of rotation with said signal of control of the direction of rotation and for delivering a correction control signal when the direction of rotation of the rotor is incorrect; and means responsive to said correction control signal for interrupting said normal driving pulse and controlling the application of a correction driving pulse to the coil in order to make the rotor turn in the direction imposed by said signal of control of the direction of rotation.

21. A stepping motor assembly according to claim 20, wherein said control circuit is arranged so that the application of a correction driving pulse produces the reversal of the order of succession of the polarities for the following normal driving pulses.

22. A stepping motor assembly according to claim 20, wherein the comparison between the value of the current in the coil with said threshold value takes place before the rotor has left its rest position.

23. A stepping motor assembly according to claim 20, wherein said means for determining the direction of rotation of the rotor include a measuring resistor for providing a voltage proportional to the current in the coil, switching means responsive to test pulses for connecting said measuring resistance in series with said coil for the duration of said test pulses and for short-circuiting this resistance outside said pulses and a comparator for comparing said voltage proportional to the current with a reference voltage proportional to said threshold value.

24. A stepping motor assembly according to claim 20, wherein said means for interrupting the normal driving pulse and controlling the application of a correction driving pulse comprise a gate circuit for shutting off the normal control pulse and transmitting to the control circuit a correction control pulse produced by said pulse-forming circuit and delayed with respect to said normal control pulse.

* * * * *